April 20, 1937. K. E. KYLÉN 2,077,761
CRANKSHAFT SEAL
Filed July 27, 1935
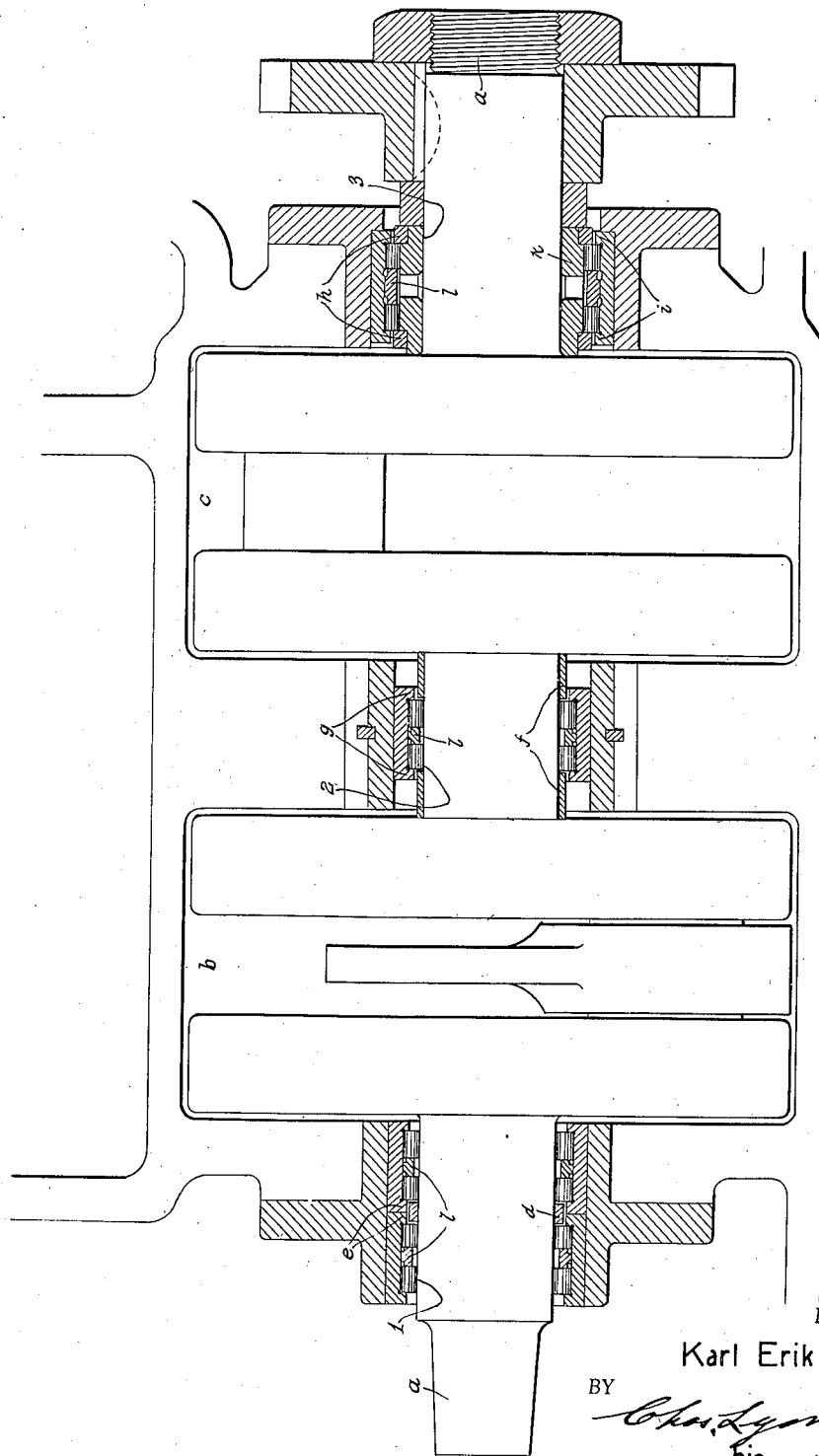
INVENTOR.
Karl Erik Kylén
BY
his ATTORNEY.

Patented Apr. 20, 1937

2,077,761

UNITED STATES PATENT OFFICE 2,077,761

CRANKSHAFT SEAL

Karl Erik Kylén, Goteborg, Sweden, assignor to Aktiebolaget Svenska Kullagerfabriken, Goteborg, Sweden, a corporation of Sweden Application July 27, 1935, Serial No. 33,529
In Germany August 1, 1934

5 Claims. (Cl. 308—187.1)

In 2-stroke motors there is usually an overpressure in the crank case before the compression period in the cylinder, as the crank case is used for pre-compression. In all such motors the crank shaft seals often cause difficulties, as it is impossible to attain an over-pressure in the crank case, if the seals are ineffective. Consequently the question of sealing has always required painstaking attention. A sealing ring is usually applied for this purpose, the said ring being fixed to the shaft with a close running fit and pressed against the stationary wall of the crank case by means of springs. This kind of seal is very frequently used, but has, however the disadvantage of being very expensive. The sliding surfaces as well as the corresponding surfaces in the crank case must have a very fine finish in order to assure a reliable seal. Furthermore the running fit of the rotating sealing ring on the shaft must be as close as possible to prevent a too wide space between sealing ring and shaft.

The object of the invention is therefore to provide a cheap seal for such crank cases. On the rotating member, i. e. on the crank shaft, a ring is provided, the diameter of which is only slightly smaller than that of the shoulder of the outer bearing ring. The seal is consequently formed by the outer bearing ring and the ring mounted on the crank shaft. The space between the parts is only a few tenths of a millimeter in width. Depending on the conditions, the ring can be made as a distance ring to be placed for instance between the cheek of the crank shaft and the roller sets. It can then be used to fix the roller bearing axially. It is also possible to mount the ring on the inner race ring of the roller bearing. Since seals of this kind are provided at each shoulder of the outer bearing ring, the efficiency of the seal is further improved. Distance rings located between the roller sets and which are guided at the outer raceway of the roller, may also serve as sealing rings. The sealing space is in this case provided between the sealing ring and the inner roller raceway. The diameter of the sealing ring is only slightly greater than that of the raceway.

In the drawing which is a view partly in longitudinal, horizontal section and partly in elevation, the invention is illustrated as applied to a two cylinder 2-stroke motor. The crank shaft $a$ of the motor is journaled in three places. There are two crank cases $b$ and $c$ which have to be sealed against the atmosphere and reciprocally. The crank shaft is journaled in multi-row cylindrical roller bearings. The bearing I is a four-row cylindrical roller bearing comprising two double-row bearings with a common outer ring. Within the adjacent shoulders $e$ of the two outer bearing rings a ring $d$ is mounted on the crank shaft which ring has a slightly smaller outer diameter than the inner diameter of the adjacent shoulders $e$ of the outer bearing ring. The ring $d$ and the two shoulders $e$ thus cooperate to form the seal. The middle bearing 2 is a double row cylindrical roller bearing with a single outer ring common to both rows of rollers. This bearing is held in position by means of two distance sleeves $f$. The distance sleeves are of slightly smaller diameter than the shoulders $g$ of the outer bearing ring. The sealing closure will thus be located between the ends of the distance sleeves $f$ and the shoulders $g$ of the outer bearing ring. The bearing 3 is a double-row cylindrical roller bearing with inner race ring. Here the sealing rings $h$ are applied on the inner ring $k$. The rings $h$ have a somewhat smaller diameter than the shoulders $i$ of the outer bearing ring. The sealing closure will thus here be located between the rings $h$ and the shoulders $i$ of the outer ring. In addition to the rings $d$, $f$ and $h$ mounted on the shaft, the rings $l$ can also be utilized as sealing rings between the roller sets and guided by the outer raceway of the rollers. The inner diameter of these rings is then only a few tenths of a millimeter greater than that of the inner raceway. The sealing closure will then be located between the ring and the inner raceway of the rollers. It is important that the clearance between the sealing parts be only a few tenths of a millimeter and located substantially at the height of the axes of the rollers, i. e. where the greater part of the opening is covered by the end surfaces of the rollers.

Having thus described my invention, I claim and desire to secure by Letters Patent:

1. A crank shaft seal for internal combustion engines operable with crank case compression, comprising in combination a crank case, a crank shaft and a series of antifriction rollers interposed between the crank case and the crank shaft, a stationary sealing member and a rotatable sealing member located laterally of said rollers and having surfaces engaging with and conforming to the shape of the end surfaces of the said rollers, there being a narrow annular space between the said sealing members located substantially at the height of the axes of the said rollers.

2. A crank shaft seal according to claim 1, characterized thereby that sealing ring or rings also form distance sleeves between the roller sets and the crank cheeks.

3. A crank shaft seal according to claim 1, characterized thereby that the sealing ring or rings are mounted on the inner bearing ring.

4. A crank shaft seal according to claim 1, characterized thereby that the clearance between the sealing parts is located substantially midway between outer and inner roller races.

5. A crank shaft seal for internal combustion engines with crank case compression, comprising in combination a crank case, a crank shaft and a series of antifriction rollers interposed between the crank case and the crank shaft, a stationary sealing member and a rotatable sealing member located laterally of said rollers, there being a narrow annular space between the said sealing members located substantially at the height of the axes of the said rollers at the region where the greater part thereof is covered by the end surfaces of the rollers.

KARL ERIK KYLÉN.